(12) United States Patent
Nishio

(10) Patent No.: US 6,804,713 B1
(45) Date of Patent: Oct. 12, 2004

(54) OPERATIONAL SUPERVISORY SYSTEM FOR A SERVER

(75) Inventor: Miwa Nishio, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/549,687

(22) Filed: Apr. 14, 2000

(30) Foreign Application Priority Data

Jul. 28, 1999 (JP) .......................................... 11-212974

(51) Int. Cl.[7] .......................................... G06F 15/173
(52) U.S. Cl. ..................................... 709/224; 709/223
(58) Field of Search ................................ 709/223, 224; 714/31, 39

(56) References Cited

U.S. PATENT DOCUMENTS

| | | | | |
|---|---|---|---|---|
| 5,732,219 A | * | 3/1998 | Blumer et al. | 709/227 |
| 5,890,164 A | * | 3/1999 | Nielsen | 707/201 |
| 6,012,087 A | * | 1/2000 | Freivald et al. | 709/218 |
| 6,219,818 B1 | * | 4/2001 | Freivald et al. | 714/799 |
| 6,286,050 B1 | * | 9/2001 | Pullen et al. | 709/229 |
| 6,330,589 B1 | * | 12/2001 | Kennedy | 709/206 |
| 6,389,464 B1 | * | 5/2002 | Krishnamurthy et al. | 709/220 |
| 6,397,246 B1 | * | 5/2002 | Wolfe | 709/217 |
| 6,412,021 B1 | * | 6/2002 | Nguyen et al. | 709/318 |
| 6,438,585 B2 | * | 8/2002 | Mousseau et al. | 709/206 |
| 6,484,200 B1 | * | 11/2002 | Angal et al. | 709/224 |
| 6,493,671 B1 | * | 12/2002 | Ladd et al. | 704/270 |
| 6,513,060 B1 | * | 1/2003 | Nixon et al. | 709/203 |
| 6,639,975 B1 | * | 10/2003 | O'Neal et al. | 379/112.01 |

FOREIGN PATENT DOCUMENTS

| | | |
|---|---|---|
| JP | 10-254732 | 9/1998 |
| JP | 10-275093 | 10/1998 |

* cited by examiner

Primary Examiner—Saleh Najjar
(74) Attorney, Agent, or Firm—Rabin & Berdo, P.C.

(57) ABSTRACT

In an operational supervisory system for a server, a data registration section (21) registers a character string contained in an HTML document (12) on a server (10) to be operationally supervised. A server supervisory section (22) accesses to the HTML document on the server (10) to be operationally supervised along a schedule of a supervisory time registration section (23) and searches whether or not the character string registered in the data registration section (21) exists in the document. If the character string is not contained in the document, it is judged that the server (10) to be operationally supervised is abnormal, and a result notification section (25) notifies a supervisor notification receiver section (30) of the fact that the abnormality occurs.

14 Claims, 5 Drawing Sheets

OPERATIONAL SUPERVISORY SYSTEM FOR A SERVER

BACKGROUND OF THE INVENTION

1. Field of the Invention

The present invention relates to an operational supervisory system for a server, which conducts operational supervision for a server such as a WWW server that conducts information transmission over the internet.

2. Description of the Related Art

Up to now, in supervising that the WWW server normally operates, a supervisor who manages the WWW server or a third party who takes charge of the supervision conducts the following procedure.

1) The supervisor accesses to an arbitrary HTML document on the WWW server and recognizes that the HTML document is displayed, by using the WWW browser.

2) The supervisor recognizes that information inputted on an arbitrary information input screen is processed by CGI (common gateway interface) program on the WWW server and the processing result is displayed on the WWW browser.

However, in the above conventional method, the supervisor who manages the WWW server must implement a supervisory work regularly or irregularly, which is time-consuming. Also, in order to implement the work, the supervisor stays in an environment where he can use the WWW browser.

On the other hand, in the case where the WWW server does not operate, the supervisor cannot quickly cope with this fault as a result of neglecting the supervisory work, and there is a fear that damage becomes large if the WWW server is used on business. Under the circumstance, it is desirable to pressingly realize the countermeasure against the above fault.

SUMMARY OF THE INVENTION

The present invention has been made in order to solve the above problem associated with the conventional system, and therefore has an object thereof to provide an operational supervisory system for a server which is capable of reducing a time required for the supervisory work and also quickly coping with an abnormality of the server if the abnormality occurs.

To achieve the above object, according to a first aspect of the present invention, there is provided an operational supervisory system for a server, characterized by comprising: a data registration section for previously registering a character string contained in an arbitrary document on a server to be operationally supervised; and a server supervision section for requesting the server to be operationally supervised to transmit the arbitrary document, retrieving the character string registered in the data registration section from data returned from the server to be operationally supervised, and judging that a fault occurs in the server to be operationally supervised if no character string exists in the data registration section.

According to a second aspect of the present invention, there is provided an operational supervisory system for a server, characterized by comprising: a data registration section for previously registering a character string contained in a processing result returned from processing means, the processing means conducting a predetermined processing to return the processing result when specific information is received on the server to be operationally supervised; and a server supervision section for transmitting specific information to the server to be operationally supervised, retrieving a character string registered in the data registration section from the processing result returned from the server to be operationally supervised, and judging that a fault occurs in the server to be operationally supervised if no character string exists in the data registration section.

According to a third aspect of the present invention, there is provided an operational supervisory system for a server as described in the first or second aspect of the present invention, characterized by further comprising: a supervisory time registration section for registering a supervisory schedule; and a server supervisory section for conducting a supervisory processing on the server to be operationally supervised according to a schedule registered in the supervisory time registration section.

According to a fourth aspect of the present invention, there is provided an operational supervisory system for a server as described in any one of the first to third aspects of the present invention, characterized by further comprising: a data registration section for storing an electronic mail address of a fault notification destination; a message storage section for storing a predetermined message template; and a result notification section for producing a message on fault occurrence information in the server supervision section by using the template stored in the message storage section, and for transmitting the message to the electronic mail address.

According to a fifth aspect of the present invention, there is provided an operational supervisory system for a server as described in any one of the first to third aspects of the present invention, characterized by further comprising: a data registration section for storing a facsimile No. of a fault notification destination; a message storage section for storing a predetermined message template; and a result notification section for producing a message on fault occurrence information in the server supervision section by using the template stored in the message storage section, and for transmitting the message to the facsimile No.

According to a sixth aspect of the present invention, there is provided an operational supervisory system for a server as described in any one of the first to third aspects of the present invention, characterized by further comprising: a data registration section for storing a pager No. of a fault notification destination; a message storage section for storing a predetermined message template; and a result notification section for producing a message on fault occurrence information in the server supervision section by using the template stored in the message storage section, and for transmitting the message to the pager No.

BRIEF DESCRIPTION OF THE DRAWINGS

These and other objects, features and advantages of this invention will become more fully apparent from the following detailed description taken in conjunction with the accompanying drawings in which.

DETAILED DESCRIPTION OF THE PREFERRED EMBODIMENTS

Now, a description of the present invention will be given in more detail of preferred embodiments of the present invention with reference to the accompanying drawings.

First Embodiment

Figure 1:
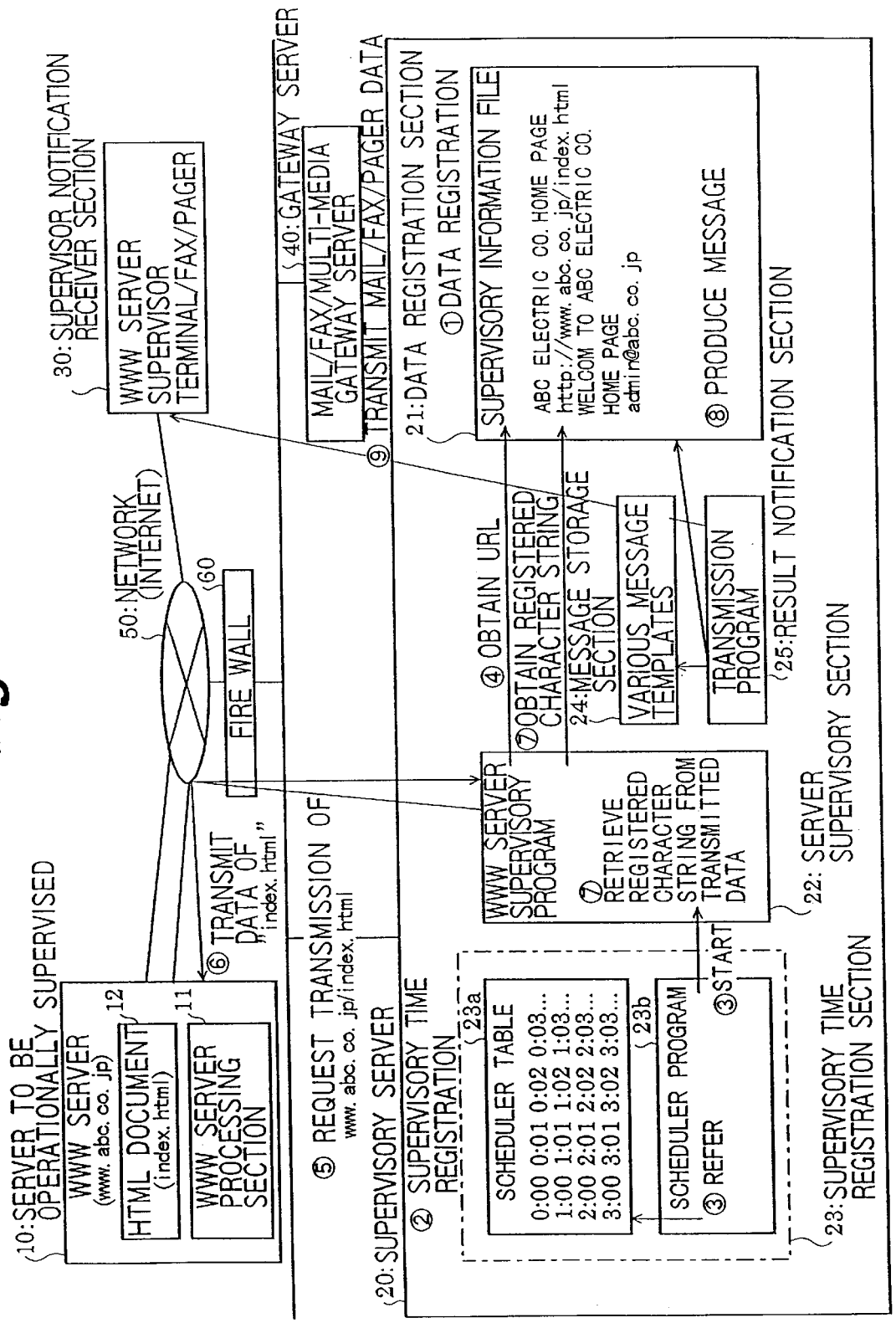
FIG. 1 is an explanatory diagram showing the structure and processing of an operational supervisory system for a server in accordance with a first embodiment of the present invention.

FIG. 1 is an explanatory diagram showing the structure and processing of an operational supervisory system for a server in accordance with a first embodiment of the present invention.

The system shown in FIG. 1 includes a server 10 to be operationally supervised, a supervisory server 20, a supervisor notification receiver section 30, a gateway server 40, a network 50 and a fire wall 60.

The server 10 to be operationally supervised is comprised of a WWW server that conducts information transmission over the internet and includes a WWW server processing section 11. The WWW server processing section 11 is a server section that supplies various services. Also, in the figure, reference numeral 12 denotes an HTML document that is supplied by the WWW server processing section 11.

The supervisory server 20 is so adapted as to supervise the operation of the server 10 to be operationally supervised through the network 50 and includes a data registration section 21, a server supervisory section 22, a supervisory time registration section 23, a message storage section 24 and a result notification section 25.

The data registration section 21 serves as a function section that stores therein URL (uniform resource locator) which is a path extending up to a document to be supervised, a character string for conducting the operational judgement by the server supervisory section 22, and information such as electronic mail addresses/FAX Nos./pager Nos. in the supervisor notification receiver section 30. The server supervisory section 22 takes out the URL from the data registration section 21 on the basis of the supervisory schedule of the supervisory time registration section 23, accesses to the URL and investigates whether the registered character string exists in the document, or not, thus judging whether or not the server 10 to be operationally supervised normally operates.

The supervisory time registration section 23 serves as a function section that registers the supervisory schedule of the server supervisory section 22 and includes a scheduler table 23a and a scheduler program 23b. The scheduler table 23a serves as a table for storing a supervisory time therein and the scheduler program 23b serves as means that starts a supervisory processing by the server supervisory section 22 referring to the scheduler table 23a.

The message storage section 24 serves as a function section that stores the template of the message transmitted to the electronic mail, the facsimile or the pager therein. The result notification section 25 serves notification means that notifies the supervisor notification receiver section 30 of the message by using the message of the message storage section 24.

The supervisor notification receiver section 30 serves as a function section that allows the supervisor of the server 10 to be operationally supervised to receive the supervisory result (fault occurrence), which is made up of a terminal that receives the electronic mail, a facsimile or a pager.

The gateway server 40 functions as a gateway in the case where the result notification section 25 notifies the supervisor notification receiver section 30 of information through the network 50. The network 50 functions as a network such as internet which is the assembly of a computer network over which the server 10 to be operationally supervised, the supervisory server or the like conducts communication in accordance with a specific protocol. Also, the fire wall 60 serves as a function section disposed between an LAN connected with the supervisory server 20 and the gateway server 40 and the network 50 to protect illegal entrances from the network 50.

Subsequently, a specific structure and operation that realize the above functions will be described for each of the various notification means.

Figure 2:
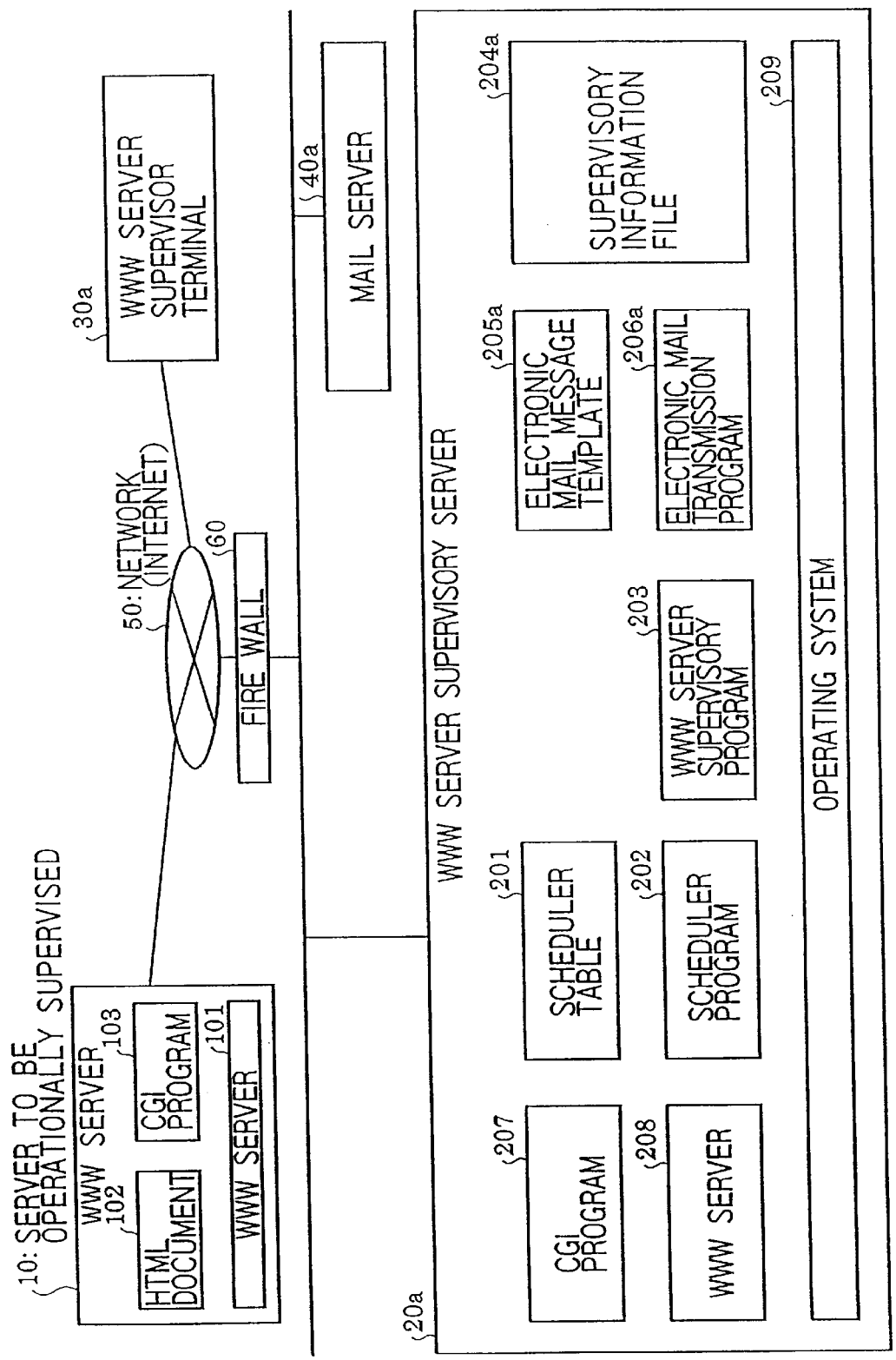
FIG. 2 is a structural diagram showing the operational supervisory system for a server in accordance with the present invention in which a notification is given to a supervisor by using an electronic mail.

1. A case of notification by electronic mail:

FIG. 2 is a structural diagram showing the operational supervisory system for a server in the case where information is notified a supervisor of by an electronic mail.

The system shown in FIG. 2 includes a server 10 to be operationally supervised, a supervisory server 20a, a WWW server supervisor terminal 30a, a mail server 40a, a network 50 and a fire wall 60.

The server 10 to be operationally supervised is comprised of a WWW server 101, an HTML document 102 and a CGI program 103. The WWW server 101 corresponds to the WWW server processing section 11 shown in FIG. 1, and the HTML document 102 corresponds to the HTML document 12 shown in FIG. 1. Also, the CGI program 103 functions as processing means that conducts a predetermined processing and returns a processing result to the browser when receiving some information.

The supervisory server 20a includes a scheduler table 201, a scheduler program 202, a WWW server supervisory program 203, a supervisory information file 204a, an electronic mail message template 205a, an electronic mail transmission program 206a, a CGI program 207, a WWW server 208 and an operating system 209.

The scheduler table 201 and the scheduler program 202 correspond to the scheduler table 23a and the scheduler program 23b shown in FIG. 1, respectively. Also, the WWW server supervisory program 203, the supervisory information file 204a, the electronic mail message template 205aand the electronic mail transmission program 206a correspond to the server supervisory section 22, the data registration section 21, the message storage section 24 and the result notification section 25 shown in FIG. 1, respectively.

The CGI program 207 functions as processing means that conducts a predetermined processing and returns a processing result to the browser when receiving some information as in the CGI program 103 of the server 10 to be operationally supervised. Also, the WWW server 208 functions as a processing section for supplying various services as the supervisory server 20a. In addition, the operating system 209 functions as basic program used for the scheduler table 201 to the WWW server 208 in the supervisory server 20a to conduct the respective processings.

The WWW server supervisor terminal 30a corresponds to the supervisor notification receiver section 30 in FIG. 1, and functions as a terminal from which the supervisor receives the electronic mail. The mail server 40*a* is so adapted as to store the electronic mail transmitted by the electronic mail transmission program 206*a* therein.

The network 50 and the fire wall 60 are identical in structure with those in FIG. 1.

Subsequently, the operation of the operational supervisory system for a server thus structured will be described with reference to FIG. 1. Processings indicated by circled numerals in FIG. 1 correspond to the following description.

(1) Registration of various information necessary for supervising the server 10 to be operationally supervised.

A supervisory information file in which the following information necessary for supervising the server 10 to be operationally supervised is registered is produced in advance.
(a) Name of the WWW server to be supervised Example) ABC Electric Co. home page
(b) Path extending up to the HTML document on the WWW server to be supervised Example) http://www.abc.co.jp//index.html
(c) Retrieved character string (a character string contained in the HTML document designated by the above item (b)) Example) Welcome to ABC Electric Co. home page
(d) Fault notification destination mail address (2) Registration of the supervisory time to the scheduler table 201

A time at which the WWW server is supervised is registered in the scheduler table in advance.

(3) Start of the WWW server supervisory program

The scheduler program 202 automatically starts the WWW server supervisory program 203 at a time defined in the scheduler table 201.

(4) Obtaining of information pertaining to the WWW server

The WWW server supervisory program 203 obtains path information (for example, www.abc.co.jp/index.html) up to the HTML document 102 on the server 10 to be operationally supervised from the supervisory information file 204*a*.

(5) Request of transmission of the information to the server 10 to be operationally supervised The WWW server supervisory program 203 requests the WWW server to be supervised (for example, www.abc.co.jp) to transmit the HTML document (for example, index.html) by using the HTTP protocol.

(6) Return of the HTML data

The server 10 to be operationally supervised returns data of the HTML document (for example, index.html) which is requested to be transmitted to the supervisory server 20.

(7) Obtaining and retrieval of the retrieved character string

The WWW server supervisory program 203 ascertains whether or not the retrieved character string (for example, welcome to ABC Electric Co. home page) registered in the supervisory information film 204 by the above item (1) is present in the data transmitted from the server 10 to be operationally supervised in the above item (6).

(8) Preparation of the supervised result notification message

As a result of the above item (7), if no retrieved character string exists, the WWW server supervisory program 203 judges that the server 10 to be operationally supervised does not normally operate and produces a message for notifying the WWW server supervisor of the judgement.

In other words, the electronic mail transmission program 206*a* pads a device to which the electronic mail message template 205*a* is transmitted with the fault notified electronic mail address on the supervisory information file 204*a* to produce the transmission mail message.

(9) Transmission of the supervised result to the electronic mail

A fact that an abnormality is detected is notified the electronic mail address of the WWW server supervisor of.

That is, the electronic mail transmission program 206*a* transmits the electronic mail produced by the above item (8) to the mail server 40*a*. The mail server 40*a* transmits the electronic mail to the mail address of the WWW server supervisor over the network 50.

Figure 3:
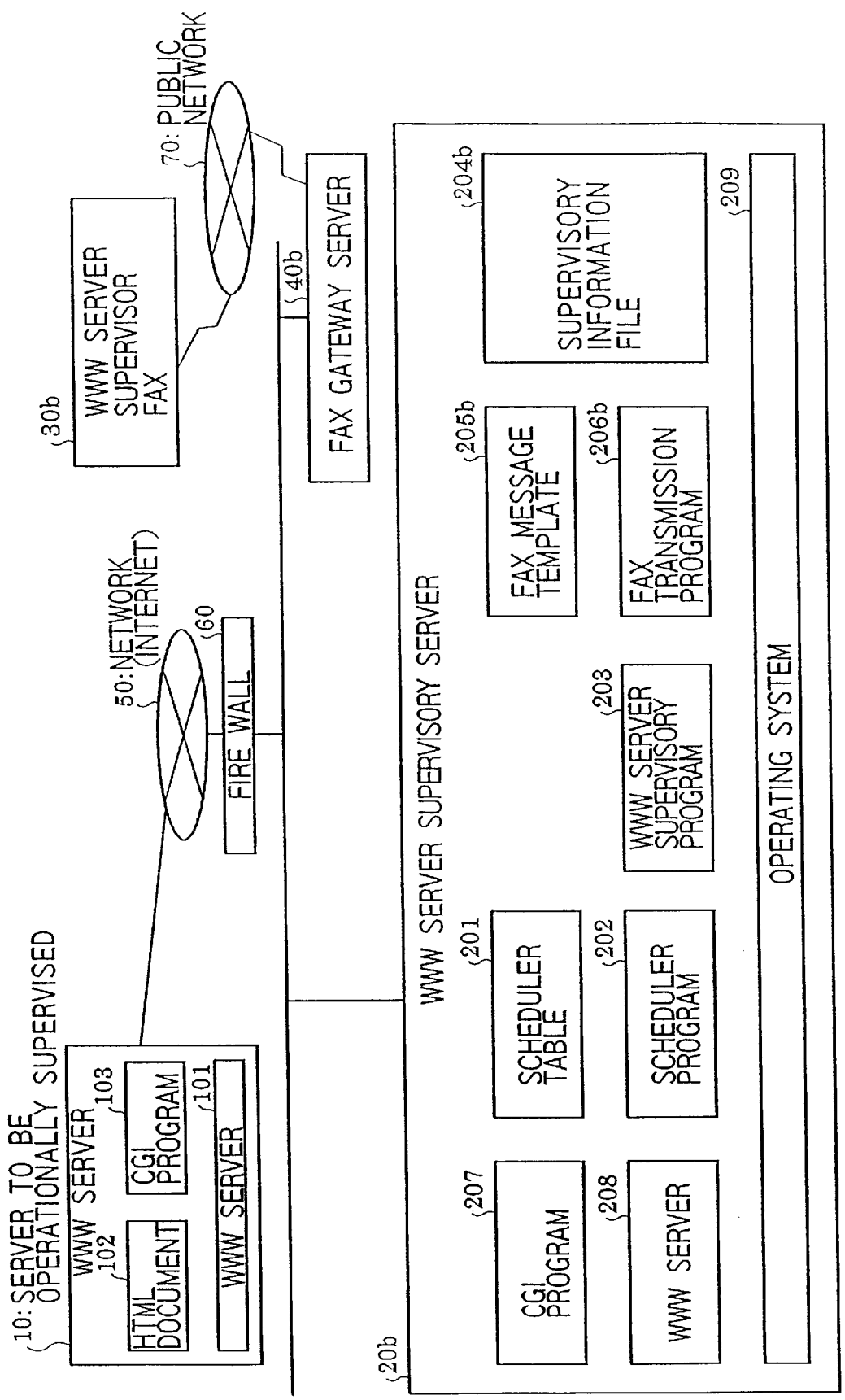
FIG. 3 is a structural diagram showing the operational supervisory system for a server in accordance with the present invention in which a notification is given to a supervisor by using a facsimile.

2. A case of notification by a facsimile:

FIG. 3 is a structural diagram showing the operational supervisory system for a server in which information is notified a supervisor of by facsimile.

The system shown in FIG. 3 includes a server 10 to be operationally supervised, a supervisory server 20*b*, a supervisor FAX 30*b*, a FAX gateway server 40*b*, a network 50 and a fire wall 60. In this example, what is different from the case in which notification is made by the above electronic mail resides in a supervisory information film 204*b*, a FAX message template 205*b* and a FAX transmission program 206*b* in the supervisory server 20*b*, a supervisor FAX 30*b*, a FAX gateway server 40*b* and a public switched telephone network 70.

The supervisory information file 204*b* stores the supervisory information of the server 10 to be operationally supervised and the FAX No. information to the supervisor therein. The FAX transmission program 206*b* functions as a program for producing a facsimile message by using the template stored in the FAX message template 205*b* to transmit the facsimile message to the FAX No. of the supervisory information file 204*b*. Also, the FAX message template 205*b* is a template of a predetermined facsimile message.

The supervisor FAX 30*b* functions as a FAX for the supervisor of the server 10 to be operationally supervised to receive a notification. Also, the FAX gateway server 40*b* is so adapted as to transmit the facsimile message addressed to the supervisor FAX 30*b* which is transmitted from the supervisory server 20*b* to the supervisor FAX 30*b* over the public network 70. The public network 70 is an ISDN or analog telephone line.

Subsequently, the operation of the operational supervisory system for a server thus structured will be described.

In this example, since the processings (1) to (7) are identical with those in the above-described case of notification by using the electronic mail, only different processings (8) and (9) will be described.

(8) Preparation of the supervised result notification message

As a result of the above item (7), if no retrieved character string exists, the WWW server supervisory program 203 judges that the server 10 to be operationally supervised does not normally operate and produces a message for notifying the WWW server supervisor of the judgement.

In other words, the FAX transmission program 206*b* pads a device to which the FAX message template 205*b* is transmitted with the fault notified FAX No. on the supervisory information file 204*b* to produce the transmission facsimile message.

(9) Transmission of the supervised result to the FAX

A fact that an abnormality is detected is notified the FAX of the WWW server supervisor of.

That is, the FAX transmission program 206*b* transmits the facsimile message produced by the above item (8) to the FAX gateway server 40*b*. The FAX gateway server 40*b* transmits the facsimile message to the supervisor FAX 30*b* of the WWW server supervisor over the public network 70.

Figure 4:
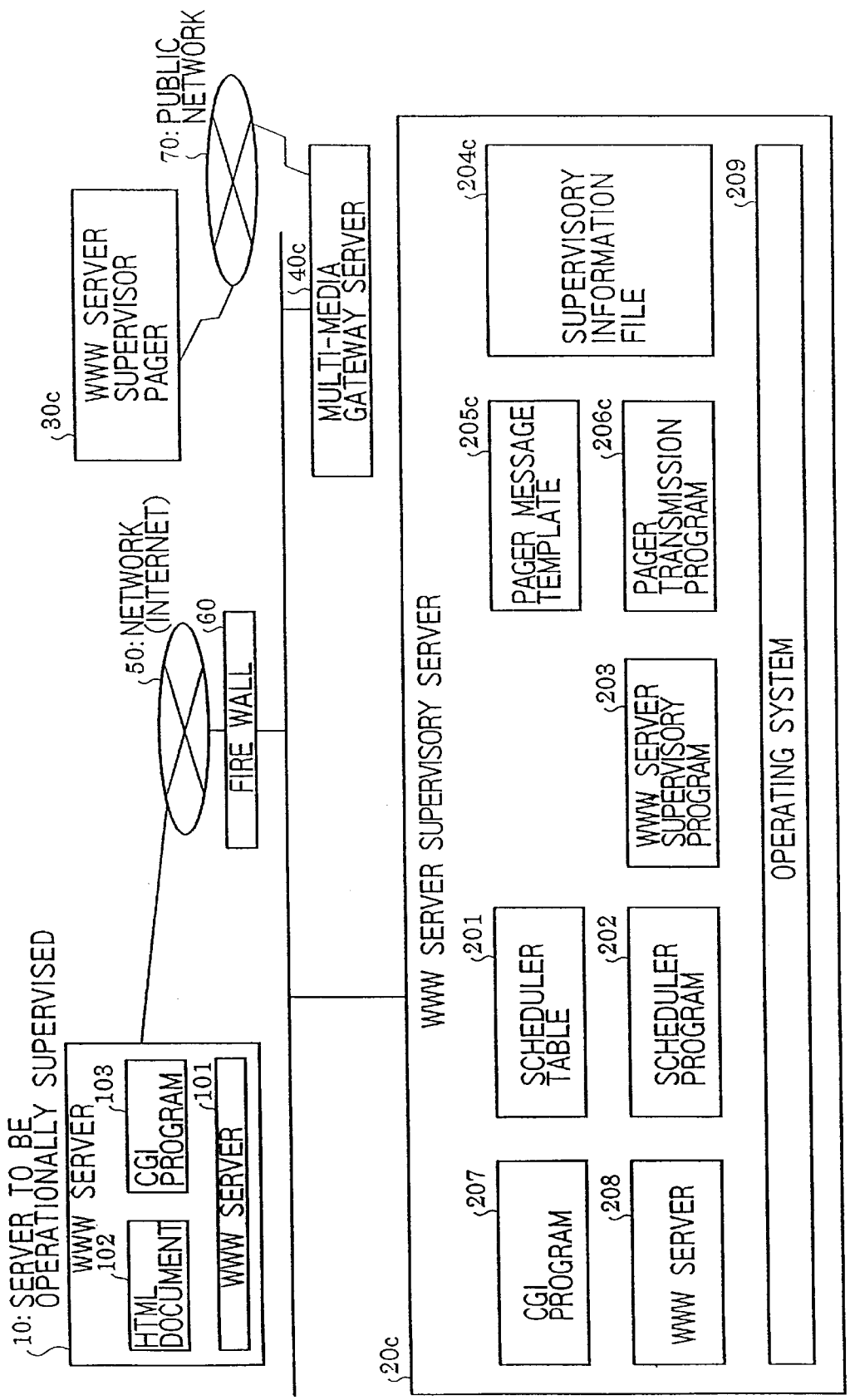
FIG. 4 is a structural diagram showing the operational supervisory system for a server in accordance with the present invention in which a notification is given to a pager of a supervisor.

3. A case of notification by a pager:

FIG. 4 is a structural diagram showing the operational supervisory system for a server in which information is notified a supervisor of by a pager.

The system shown in FIG. 4 includes a server 10 to be operationally supervised, a supervisory server 20c, a supervisor pager 30c, a multi-media gateway server 40c, a network 50 and a fire wall 60. In this example, what is different from the case in which notification is made by the above electronic mail or FAX resides in a supervisory information film 204c, a pager message template 205c and a pager transmission program 206c in the supervisory server 20c, a supervisor pager 30c and a multi-media gateway server 40c.

The supervisory information file 204c stores the supervisory information of the server 10 to be operationally supervised and the pager No. information to the supervisor therein. The pager transmission program 206cfunctions as a program for producing a pager message by using the template stored in the pager message template 205c to transmit the pager message to the pager No. of the supervisory information file 204c. Also, the pager message template 205c is a predetermined message template to the pager.

The supervisor pager 30c functions as a pager for receiving a message indicative of abnormality by the supervisor of the server 10 to be operationally supervised. Also, the multi-media gateway server 40c is so adapted as to transmit the message addressed to the supervisor pager 30cwhich is transmitted from the supervisory server 20 to the supervisor pager 30c over the public network 70.

Subsequently, the operation of the operational supervisory system for a server thus structured will be described.

Even in the example where notification is made by the pager, since the processings (1) to (7) are identical with those in the above-described case of notification by using the electronic mail or FAX, only different processings (8) and (9) will be described.

(8) Preparation of the supervised result notification message

As a result of the above item (7), if no retrieved character string exists, the WWW server supervisory program 203 judges that the server 10 to be operationally supervised does not normally operate and produces a message for notifying the WWW server supervisor of the judgement.

In other words, the pager transmission program 206c pads a device to which the pager message template 205c is transmitted with the fault notified pager No. on the supervisory information file 204c to produce the transmission pager message.

(9) Transmission of the supervised result to the pager

A fact that an abnormality is detected is notified the pager of the WWW server supervisor of.

That is, the pager transmission program 206c transmits the message produced by the above item (8) to the multimedia gateway server 40c. The multi-media gateway server 40c transmits the data to the supervisor pager 30cof the WWW server supervisor over the public network 70.

As described above, according to the first embodiment, the data registration section 21 registers a path extending up to a specific document on the server 10 to be operationally supervised and a character string contained in the document, and the server supervisory section 22 accesses to the specific document registered in the data registration section 21 along a given supervisory schedule to judge the running state of the server 10 to be operationally supervised depending on the fact as to whether the specific character string exists in the document, or not. With the above structure, there are obtained the following advantages.

(1) The operational supervision of the WWW server can be automatically made.

(2) As a result of automatically supervising the WWW server, when an abnormality is detected, the detection of abnormality can be instantly notified the WWW server supervisor of by using the electronic mail, FAX or pager.

In other words, a time necessary for the supervisory work can be reduced, and also since the detection of abnormality is notified any of electronic mail, FAX or pager of, the WWW server supervisor can instantly be informed of the abnormality of the WWW server even if the supervisor is not present in the circumstance where he can access to the WWW server, thereby making it possible to quickly cope with the abnormality.

Second Embodiment

Figure 5:
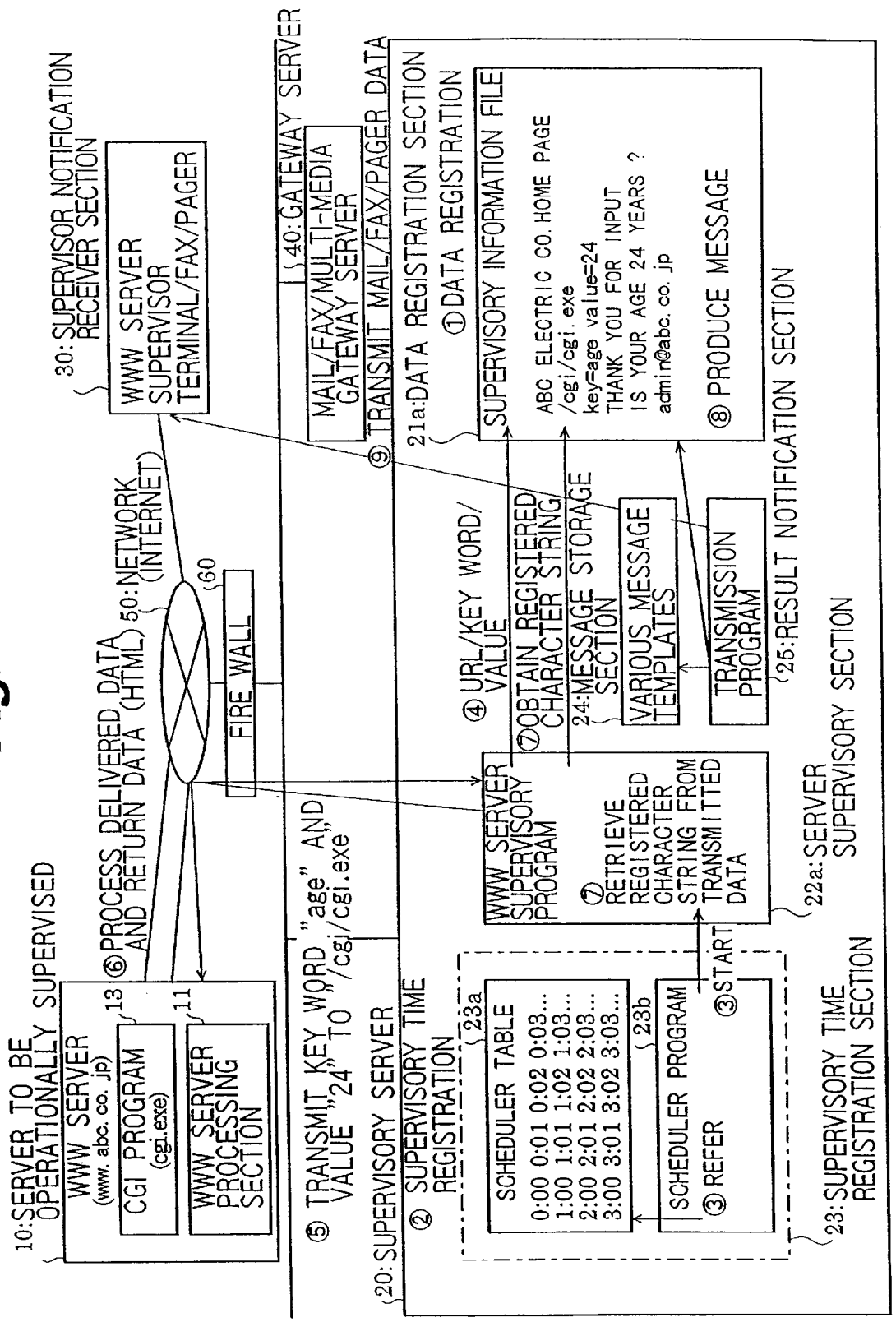
FIG. 5 is an explanatory diagram showing the structure and processing of an operational supervisory system for a server in accordance with a second embodiment of the present invention.

FIG. 5 is an explanatory diagram showing the structure and processing of an operational supervisory system for a server in accordance with a second embodiment of the present invention.

The system shown in FIG. 5 includes a server 10 to be operationally supervised, a supervisory server 20, a supervisor notification receiver section 30, a gateway server 40, a network 50 and a fire wall 60. The second embodiment is different in structure from the first embodiment in that the supervisory server 20 checks whether the CGI program of the server 10 to be operationally supervised normally operates, or not, to thereby judge its running state.

The CGI program 13 in the server 10 to be operationally supervised is so designed as to conduct a predetermined processing upon receiving some information and return the processing result corresponding to that information, which corresponds to the CGI program 103 shown in FIGS. 2 to 4.

The data registration section 21a of the supervisory server 20 functions as a storage section that registers therein URL/key word/value and a character string as a supervisory information file. The server supervisory section 22a judges whether the CGI program 13 normally operates, or not, depending on the fact of whether the registered character string exists in the document returned from the CGI program 13, or not, and judges that the server 10 to be operationally supervised normally operates if the CGI program 13 normally operates. Other structures within the supervisory server 20 are identical with those in the first embodiment.

Also, the structures of the supervisor notification receiver section 30, the gateway server 40, the network 50 and the fire wall 60 are identical with those in the first embodiment, and therefore those description will be omitted. In addition, the specific structure that realizes the above function is identical with that in FIGS. 2 to 4, and therefore its description will be omitted.

Subsequently, the operation will be described. A specific will be described with reference FIG. 2. Processings indicated by circled numerals in FIG. 5 correspond to the following description.

1. A case of notification by electronic mail:

(1) Registration of various information necessary for supervising the server 10 to be operationally supervised.

A supervisory information file in which the following information necessary for supervising the server 10 to be operationally supervised is registered is produced in advance.

(a) Name of the WWW server to be supervised Example) ABC Electric Co. home page
(b) Path extending up to the CGI program 103 on the WWW server to be supervised Example)/CGI/cgi.exe (c) Key word and value delivered to the CGI program 103 of the above item (b) Example) key=age value=24

(d) Retrieved character string (an arbitrary character string contained in the returned data when the key word and value designated by the item (c) are delivered to the CGI program 103 designated by the above item (b)) Example) Thank you for input. Is your age 24 years?

(e) Fault notification destination mail address (2) Registration of the supervisory time in the scheduler table 201

A time at which the WWW server is supervised is registered in the scheduler table 201 in advance.

(3) Start of the WWW server supervisory program

The scheduler program 202 automatically starts the WWW server supervisory program 203 at a time defined in the scheduler table 201.

(4) Obtaining of information pertaining to the WWW server

The WWW server supervisory program 203 obtains path information (for example, www./cgi/cgi.exe), the key word (example, age) and value (example, 24) up to the CGI program 103 on the server 10 to be operationally supervised from the supervisory information file 204*a*.

(5) Transmission of data to the CGI program 103 on the server to be operationally supervised The WWW server supervisory program 203 transmits the key word (example, age) and the value (example, 24) to the CGI program 103 (for example, cgi.exe) on the WWW server to be supervised by using the HTTP protocol.

(6) Return of the data processed by the CGO program 103

The CGI program 103 on the server 10 to be operationally supervised processes the key word and value which are transmitted by the item (5) produces the -HTML document (normally, returned to the WWW browser) and returns the HTML document to the supervisory server 20*a*.

(7) Obtaining and retrieval of the retrieved character string

The WWW server supervisory program 203 retrieves whether or not the retrieved character string (for example, "Thank you for input. Is your age 24 years?") registered in the supervisory information film 204*a* by the above item (1) is present in the data transmitted from the server 10 to be operationally supervised in the above item (6).

(8) Preparation of the supervised result notification message

As a result of the above item (7), if no retrieved character string exists, the WWW server supervisory program 203 judges that the server 10 to be operationally supervised does not normally operate and produces a message for notifying the WWW server supervisor of the judgement.

In other words, the electronic mail transmission program 206*a* pads a device to which the electronic mail message template 205*a* is transmitted with the fault notified electronic mail address on the supervisory information file 204*a* to produce the transmission mail message.

(9) Transmission of the supervised result to the electronic mail

A fact that an abnormality is detected is notified the electronic mail address of the WWW server supervisor of.

That is, the electronic mail transmission program 206*a* transmits the electronic mail produced by the above item (8) to the mail server 40*a*. The mail server 40*a* transmits the electronic mail to the mail address of the WWW server supervisor over the network 50.

2. A case of notification by a facsimile:

In this example, since the processings (1) to (7) are identical with those in the above-described case of notification by the electronic mail, only different processings (8) and (9) will be described. A specific structure will be described with reference to FIG. 3.

(8) Preparation of the supervised result notification message

As a result of the above item (7), if no retrieved character string exists, the WWW server supervisory program 203 judges that the server 10 to be operationally supervised does not normally operate and produces a message for notifying the WWW server supervisor of the judgement.

In other words, the FAX transmission program 206*b* pads a device to which the FAX message template 205*b* is transmitted with the fault notified FAX No. on the supervisory information file 204*b* to produce the transmission facsimile message.

(9) Transmission of the supervised result to the FAX

A fact that an abnormality is detected is notified the FAX of the WWW server supervisor of That is, the FAX transmission program 206*b* transmits the FAX produced by the above item (8) to the FAX gateway server 40*b*. The FAX gateway server 40*b* transmits the FAX to the supervisor FAX 30*b* of the WWW server supervisor over the public network 70.

3. A case of notification by a pager:

Even in the example where notification is made by using the pager, since the processings (1) to (7) are identical with those in the above-described case of notification by using the electronic mail or FAX, only different processings (8) and (9) will be described. A specific structure will be described with reference to FIG. 4.

(8) Preparation of the supervised result notification message

As a result of the above item (7), if no retrieved character string exists, the WWW server supervisory program 203 judges that the server 10 to be operationally supervised does not normally operate and produces a message for notifying the WWW server supervisor of the judgement.

In other words, the pager transmission program 206*c* pads a device to which the pager message template 205*c* is transmitted with the fault notified pager No. on the supervisory information file 204*c* to produce the transmission pager message.

(9) Transmission of the supervised result to the pager

A fact that an abnormality is detected is notified the pager of the WWW server supervisor of.

That is, the pager transmission program 206*c* transmits the message produced by the above item (8) to the multi-media gateway server 40*c*. The multi-media gateway server 40*c* transmits the data to the supervisor pager 30*c*of the WWW server supervisor over the public network 70.

As described above, according to the second embodiment, the CGI program 13 on the server 10 to be operationally supervised judges the running state of the server 10 to be operationally supervised depending on the fact of whether a specific character string is contained in the returned information, or not. With the above structure, a time necessary for the supervisory work can be reduced as in the above-described first embodiment.

In addition, since the detection of abnormality is notified any of electronic mail, FAX or pager of, the WWW server supervisor can instantly be informed of the abnormality of the WWW server even if the supervisor is not present in the circumstance where he can access to the WWW server, thereby making it possible to quickly cope with the abnormality.

Applied Embodiments

The above-described respective embodiments are applied to examples in which the abnormality of the WWW server is detected. Also, the present invention is applicable to the detection of occurrence of some event when the event occurs on the WWW server. More specifically, the character string when the event occurs is registered, and whether the character string is contained, or not, is supervised, to thereby make it possible to detect the occurrence of the event.

Also, in the above-described respective embodiments, the WWW server is employed as the server 10 to be operationally supervised, and the internet is employed as the network 50. However, the present invention is not limited to such a structure, but applicable to any servers connected to the network, likewise.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An operational supervisory system having a supervisory server that monitors a server to be operationally supervised, comprising:
    a data registration section in the supervisory server for previously registering a character string that is contained in an arbitrary document on the server to be operationally supervised;
    a server supervision section in the supervisory server for requesting the server to be operationally supervised to transmit the arbitrary document, retrieving the character string registered in said data registration section from data returned from the server to be operationally supervised, and judging that a fault occurs in the server to be operationally supervised if no character string exists in the arbitrary document that matches the character string registered in said data registration section; and
    means for notifying a supervisor if a fault in the server to be operationally supervised is judged to occur, that an abnormality needs to be fixed.

2. An operational supervisory system having a supervisory server as claimed in claim 1, further comprising:
    a supervisory time registration section in the supervisory server for registering a supervisory schedule with monitoring times; and
    a server supervisory section in the supervisory server for conducting a monitoring operations on the server to be operationally supervised according to the supervisory schedule.

3. An operational supervisory system having a supervisory server as claimed in claim 1, wherein said a data registration section stores an electronic mail address of a fault notification destination, and wherein said means for notifying comprises:
    a message storage section for storing a predetermined message template; and
    a result notification section for producing a message on fault occurrence information in said server supervision section by using the template stored in said message storage section, and for transmitting the message to the electronic mail address.

4. An operational supervisory system having a supervisory server as claimed in claim 1, wherein said a data registration section stores a facsimile number of a fault notification destination, and wherein said means for notifying comprises:
    a message storage section for storing a predetermined message template; and
    a result notification section for producing a message on fault occurrence information in said server supervision section by using the template stored in said message storage section, and for transmitting the message to the facsimile number.

5. An operational supervisory system having a supervisory server as claimed in claim 1, wherein said a data registration section stores a pager number of a fault notification destination, and wherein said means for notifying comprises:
    a message storage section for storing a predetermined message template; and
    a result notification section for producing a message on fault occurrence information in said server supervision section by using the template stored in said message storage section, and for transmitting the message to the pager number.

6. An operational supervisory system having a supervisory server as claimed in claim 1, wherein said supervisory server and said server to be operationally supervised communicate over the internet.

7. An operational supervisory system having a supervisory server that monitors a Common Gateway Interface (CGI) in a server to be operationally supervised, comprising:
    a data registration section in the supervisory server for previously registering a character string contained in a processing result returned from said CGI in the server to be operationally supervised, said CGI conducting a predetermined processing to return the processing result when specific information is received by the server to be operationally and processed by said CGI;
    a server supervision section in the supervisory server for transmitting specific information to the server to be operationally supervised, retrieving the character string registered in said data registration section from the processing result returned from the server to be operationally supervised, and judging that a fault occurs in the said CGI if no character string exists in the processing result that matches the character string registered in said data registration; and
    means for notifying a supervisor, if a fault in said CGI is judged to occur, that an abnormality needs to be fixed.

8. An operational supervisory system having a supervisory server as claimed in claim 7, further comprising:
    a supervisory time registration section for registering a supervisory schedule with monitoring times; and
    a server supervisory section for conducting monitoring operations on the server to be operationally supervised according to a the supervisory schedule.

9. An operational supervisory system having a supervisory server as claimed in claim 7, wherein said data registration section stores an electronic mail address of a fault notification destination, and wherein said means for notifying comprises:
    a message storage section for storing a predetermined message template; and a result notification section for producing a message on fault occurrence information in said server supervision section by using the template stored in said message storage section, and for transmitting the message to the electronic mail address.

10. An operational supervisory system having a supervisory server as claimed in claim 7, wherein said data registration section for storing a facsimile number of a fault notification destination, and wherein said means for notifying comprises:

a message storage section for storing a predetermined message template; and a result notification section for producing a message on fault occurrence information in said server supervision section by using the template stored in said message storage section, and for transmitting the message to the facsimile number.

11. An operational supervisory system having a supervisory server as claimed in claim 7, wherein said a data registration section stores a pager number of a fault notification destination, and wherein said means for notifying comprises:

a message storage section for storing a predetermined message template; and a result notification section for producing a message on fault occurrence information in said server supervision section by using the template stored in said message storage section, and for transmitting the message to the pager number.

12. An operational supervisory system having a supervisory server as claimed in claim 7, wherein said supervisory server and said server to be operationally supervised communicate over the internet.

13. An operational supervisory system having a supervisory server as claimed in claim 7, wherein said specific information includes a key word and said processing result includes said key word along with additional data.

14. An operational supervisory system having a supervisory server as claimed in claim 13, wherein said specific information additionally includes a value associated with the key word, and the additional data includes the value along with further data.

* * * * *